United States Patent
Bourakovski

[11] Patent Number: 5,950,513
[45] Date of Patent: Sep. 14, 1999

[54] APPARATUS FOR CONVERTING ROTARY MOTION INTO LINEAR MOTION FOR USE WITH A CUT-OFF MACHINE

[75] Inventor: Valeri Bourakovski, Novi, Mich.

[73] Assignee: Alpha Industries, Inc., Novi, Mich.

[21] Appl. No.: 08/962,876

[22] Filed: Nov. 3, 1997

Related U.S. Application Data

[63] Continuation of application No. 08/640,265, Apr. 30, 1996.
[51] Int. Cl.[6] ..................................................... B26D 1/00
[52] U.S. Cl. .................................. 83/318; 83/319; 83/320
[58] Field of Search ............................ 83/318, 319, 320; 474/135, 139, 140, 204, 205

[56] References Cited

U.S. PATENT DOCUMENTS

| | | |
|---|---|---|
| 625,340 | 5/1899 | Legg . |
| 3,083,582 | 4/1963 | Wheeler . |
| 3,151,494 | 10/1964 | Sedgwick . |
| 3,173,319 | 3/1965 | Keska et al. ................................. 83/37 |
| 3,399,578 | 9/1968 | Lindabury, Sr. et al. . |
| 3,460,421 | 8/1969 | Borzym . |
| 3,520,181 | 7/1970 | Bode, Jr. et al. ....................... 83/319 X |
| 3,748,917 | 7/1973 | Berg . |
| 3,824,871 | 7/1974 | Loesch, et al. . |
| 3,850,043 | 11/1974 | Tarbox . |
| 3,889,801 | 6/1975 | Boyer . |
| 3,973,445 | 8/1976 | Ballard . |
| 4,008,801 | 2/1977 | Reilly et al. ......................... 474/140 X |
| 4,198,875 | 4/1980 | Schneider . |
| 4,402,240 | 9/1983 | Moyer ...................................... 83/37 X |
| 4,411,182 | 10/1983 | Borzym ..................................... 83/319 |
| 4,444,077 | 4/1984 | Wise et al. ................................ 83/319 |
| 4,481,005 | 11/1984 | Mann, Jr. ................................. 474/139 |
| 4,542,670 | 9/1985 | Borzym . |
| 4,570,617 | 2/1986 | Baus . |
| 4,637,287 | 1/1987 | Kusakabe ................................. 83/319 |
| 4,747,810 | 5/1988 | Shepley et al. ......................... 474/135 |
| 4,753,119 | 6/1988 | Küspert . |
| 4,799,919 | 1/1989 | Kozachevsky . |
| 5,105,700 | 4/1992 | Kusakabe .............................. 83/320 X |
| 5,246,404 | 9/1993 | Ojima .................................. 474/140 X |

FOREIGN PATENT DOCUMENTS

| | | |
|---|---|---|
| 1059756 | 6/1959 | Germany . |
| 2729019 | 1/1978 | Germany . |
| 2910373 | 2/1984 | Germany . |
| 2130682 | 6/1984 | United Kingdom . |

Primary Examiner—M. Rachuba
Attorney, Agent, or Firm—Bliss McGlynn, P.C.

[57] ABSTRACT

An apparatus for converting rotary motion developed by a power source, such as an alternating current motor, into linear motion for use in accelerating a carriage in a reciprocal manner in a work treatment area of a cut-off machine. The apparatus includes a power train for transferring the power from the power source to a rack attached to the carriage. The power train includes a drive unit having a drive pulley, an idler pulley and an endless drive belt disposed about the pulleys. The drive belt engages the rack wherein activation of the power source results in motion of the rack which correspondingly moves the carriage.

5 Claims, 6 Drawing Sheets

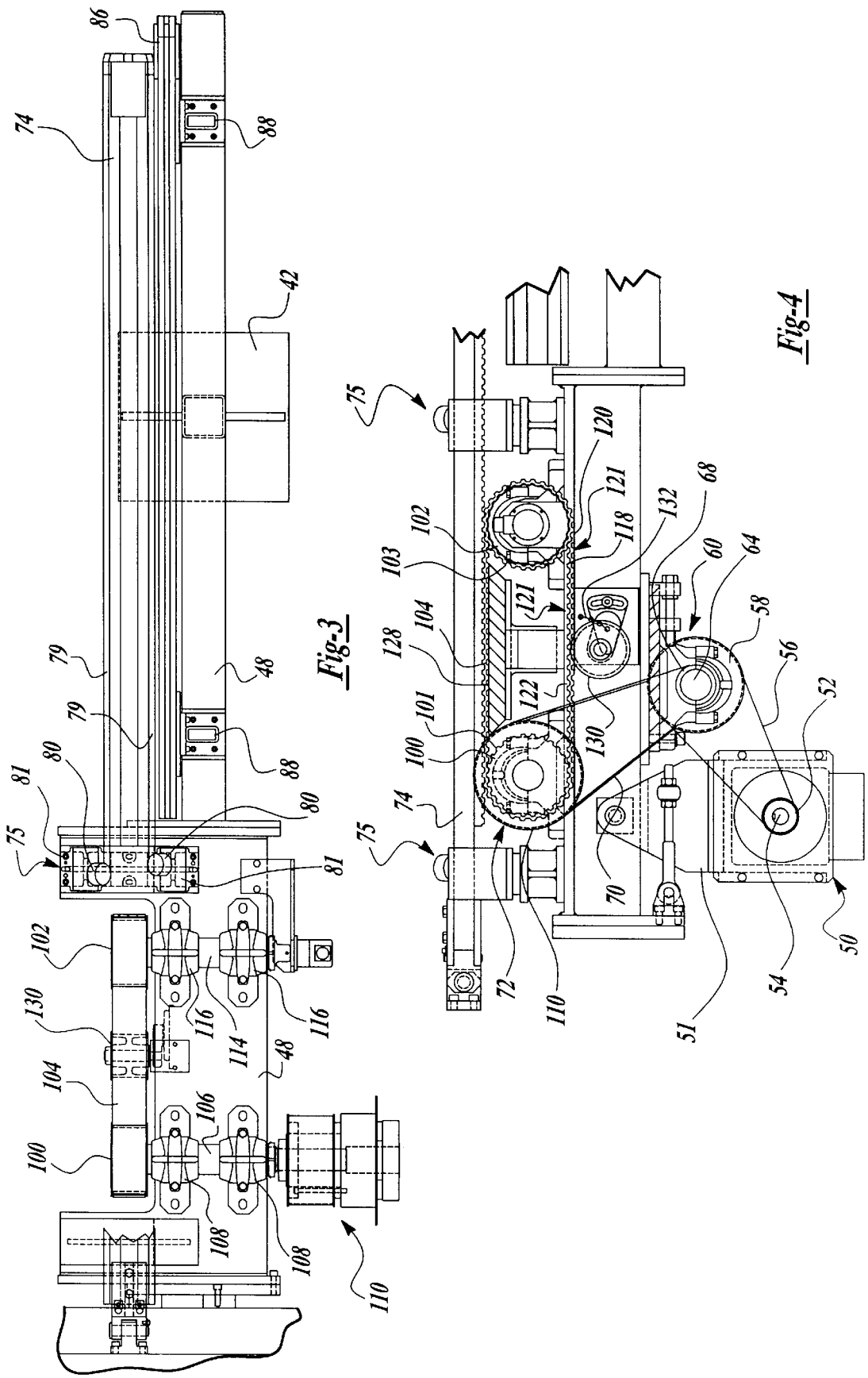

APPARATUS FOR CONVERTING ROTARY MOTION INTO LINEAR MOTION FOR USE WITH A CUT-OFF MACHINE

This is a Continuation U.S. patent application Ser. No. 08/640,265, filed Apr. 30, 1996 now abandoned.

BACKGROUND OF THE INVENTION

1. Field of the Invention

The invention pertains to an apparatus for converting rotary motion, such as developed by an electric motor, into linear motion for use in driving a carriage of a cut-off machine in a reciprocal manner, wherein the cut-off machine severs sections from a continuously emitted elongated workpiece.

More particularly, the apparatus is an accelerator for moving a cut-off die set used to sever a moving workpiece. The accelerator includes a rack and an endless belt drive unit to reciprocate the cut-off die set during the severing operation.

2. Description of the Related Art

Typically, a flying shear; i.e., a severing device utilizing a shearing blade which travels with the workpiece, is used to sever sections from a continuously emitting workpiece while the workpiece is being continuously discharged from a tube or fabrication mill without interrupting manufacture of the workpiece. Modem fabrication mills typically discharge a workpiece at a high rate of speed, up to 1200 feet per minute. A cut-off die set, which carries the shearing blade, must be reciprocated in such a manner that it is accelerated from an initial, stationary start position to a velocity equal that of the moving workpiece enabling the cut-off die set to travel with the workpiece during the severing stroke. Once the severing operation is completed, the cut-off die set is retracted to the initial, stationary start position in preparation for the next cut. Reciprocation of the cut-off die set during the severing operation is a function normally performed by an accelerator.

Accelerators and accelerator systems are known; see, for example, U.S. Pat. Nos. 3,460,421 and 4,542,670. As disclosed therein, both mechanical and other types of rotary to linear motion conversion-type accelerators are known. For example, accelerators using threaded shafts containing a trapped nut and those using a gear arrangement are known. Such systems perform adequately. However, increasing the output speed of a fabrication mill increases the problems associated with accelerating a cut-off die set to the velocity of the workpiece. In particular, due to the increased mass of the cut-off die set, the increased inertia makes it difficult to both hold the cut-off die set in the proper position during the cut and return the cut-off die set to its initial position in preparation for subsequent cuts. Today's cutting speeds require accelerator speeds of approximately 1200 feet per minute and the accelerator must be able to perform and withstand cutting cycles as high as 100 cuts per minute. Such increased cycle and acceleration speeds, while attainable with present equipment, make reliability and precision difficult to obtain.

SUMMARY OF THE INVENTION

Accordingly, the present invention is a unique apparatus for converting rotary motion from a power source into linear motion to drive a carriage supporting a cut-off die set in a work treatment area of a cut-off machine. In operation, the apparatus acts to accelerate the carriage from an initial, stationary position to the velocity of an elongated workpiece continuously emitting from a fabrication mill. The apparatus maintains the carriage and corresponding cut-off die set at a velocity equal to that of the emitted workpiece while the severing operation is performed. After severing a section from the workpiece, the apparatus retracts the carriage and cut-off die set combination to the initial, stationary position in preparation for further cutting cycles.

In the preferred form, the apparatus includes a rack mounted to a frame for reciprocal movement. The frame is positioned adjacent a cut-off machine having a carriage mounted for reciprocal movement along the longitudinal axis of the elongated workpiece in a work treatment area of the cut-off machine. The rack is connected to the carriage. A drive unit secured to the frame and receiving power from a power source engages the rack. The drive unit includes a drive pulley, an idler pulley and an endless drive belt disposed over the pulleys. The drive unit is positioned such that the belt engages the rack whereby rotation of the drive pulley causes movement of the drive belt which correspondingly moves the rack. An apparatus of this type couples a rotary power source to the rack such that the rotary power source can be used to move the rack and correspondingly move the carriage and cut-off die set.

Additionally, the rack is supported in a bi-directional manner to prevent movement of the rack in a direction transverse the longitudinal axis of the rack. Such an apparatus provides a low inertia drive system which is capable of high velocity and high volume cutting cycles while reducing backlash and supporting the rack for rapid movement.

BRIEF DESCRIPTION OF THE DRAWINGS

FIG. 3 is a top view of the apparatus of FIG. 2.

FIG. 4 is an enlarged rear view of the drive unit of the apparatus of FIG. 1.

DESCRIPTION OF THE PREFERRED EMBODIMENTS

Figure 1:
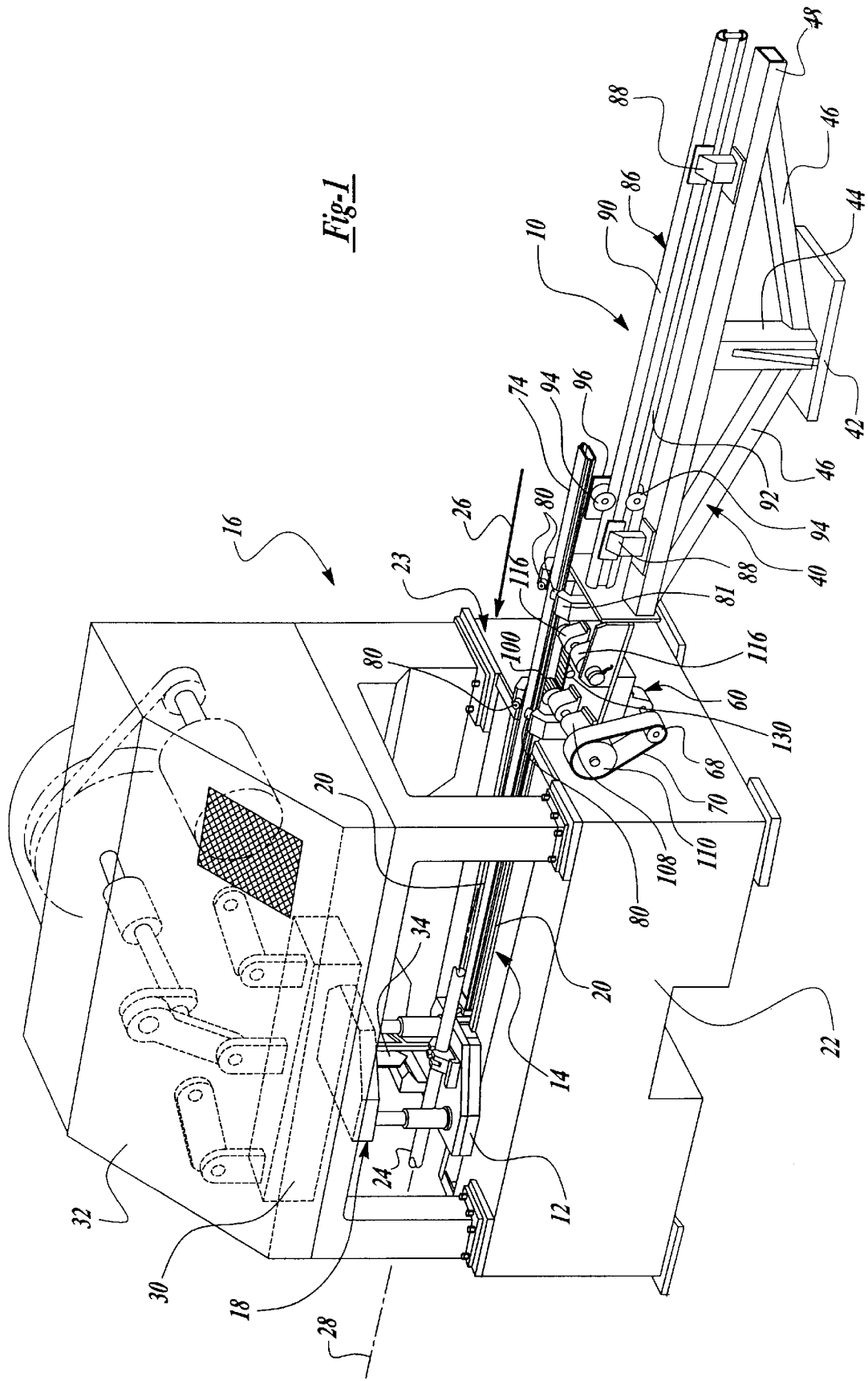
FIG. 1 is a perspective view of an apparatus for converting rotary motion into linear motion to drive a carriage in a work treatment area of a cut-off machine according to the present invention.

Referring to the drawings, and more particularly to FIG. 1 thereof, a means, seen generally at 10, for converting rotary motion into linear motion is shown for use in driving a carriage 12 in a work treatment area 14 of a cut-off machine 16. As illustrated in FIG. 1, a cut-off die set 18 is slidably movable on a set of rails 20 which are part of a press base 22. Tubing 24 emanates from a tube mill in the direction shown by the arrow 26. The cut-off die set 18 is operative to move reciprocally on the rails 20 along or parallel to the longitudinal axis 28 of the tubing 24. During the cutting operation, the cut-off die set 18 is positioned at an initial, stationary start position at one end 23 of the end of the press base 22 adjacent the accelerator 10. The tubing 24 continuously flows through the cut-off die set 18 until an amount equal to the desired length to be severed has passed, after which the cutting stroke is initialized. Initially, the means for converting rotary motion into linear motion 10 drives the cut-off die set 18 along the rails 20, accelerating the cut-off die set 18 up to the velocity of the moving tube 24. A ram 30 mounted in the press head 32 is then initiated causing the cut-off die set 18 to be clamped to the moving tube 24. The ram 30 drives a shearing blade 34 through the tube 24 thus severing a section from the continuously emitting tube 24. The ram 30 then operating in a reverse manner retracts the shearing blade 34 and also unclamps the cut-off die set 18 from the tubing 24. After the cut-off die set 18 is unclamped, the means 10 returns the cut-off die set 18 to the initial, stationary start position in preparation for subsequent cuts. Both cut-off presses and various embodiments of cut-off die sets are known. See U.S. Pat. Nos. 5,383,381 and 4,964,325, the disclosure of which are hereby incorporated by reference.

Turning now to the means for converting rotary motion into linear motion 10 which accelerates the cut-off die set 18 to the velocity of the tubing and returns it to its initial position after the cutting cycle has taken place, such a means is normally termed, and will be referred to throughout the remainder of this document as, an accelerator. Various types of accelerators are known in the prior art and are typically a means for converting rotary motion to linear motion; i.e., a method of transforming the rotary power of an electric motor to longitudinal motion for use in driving the carriage 12 of the cut-off machine 16.

FIGS. 2–8 illustrate a preferred embodiment of an apparatus for converting rotary motion into linear motion, more commonly referred to as an accelerator 10, for use with a cut-off machine 16.

Figure 7:
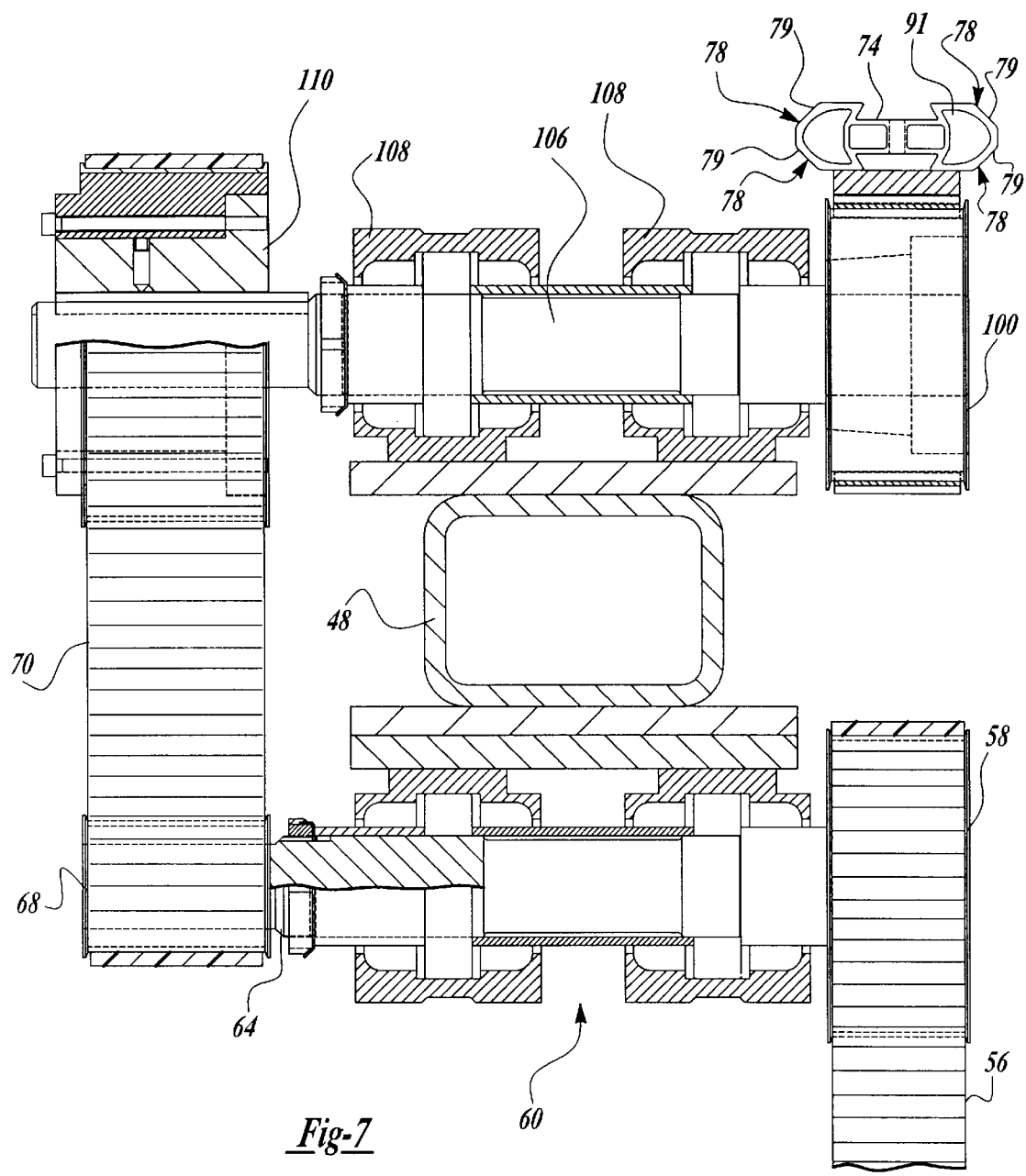
FIG. 7 is a partial cross-sectional view taken along lines 7—7 of FIG. 1.

The accelerator 10 shown in FIGS. 2–8 is generally formed of a frame 40 including a base member 42, an upright center post 44 and side brace members 46, all of which form a foundation for a support beam 48. The support beam 48 is connected to the press base 22 to provide additional rigidity and support. A power source 50, typically an AC servo motor, is attached to the support beam 48 via a bracket 51. A pulley 52 is attached to a power shaft 54 extending from the power source 50 and drives a first power transmission belt 56 which is connected to a complementary input pulley 58 attached to an input shaft 62 on a reduction unit 60. As shown in FIG. 7, the reduction unit is simply a change in diameters of the respective input 58 and output 68 pulleys. The reduction unit may also comprise a gearbox or other means of modifying the torque and speed of an input shaft. The reduction unit 60 receives an input through the input shaft 62 and operates to modify the torque and speed received from the power source 50. The reduction unit 60 transmits the resultant output to an output pulley 68 attached to the output shaft 64. A second power transmission belt 70 connects the reduction unit 60 through the output pulley 68 to a drive unit, seen generally at 72.

Figure 8:
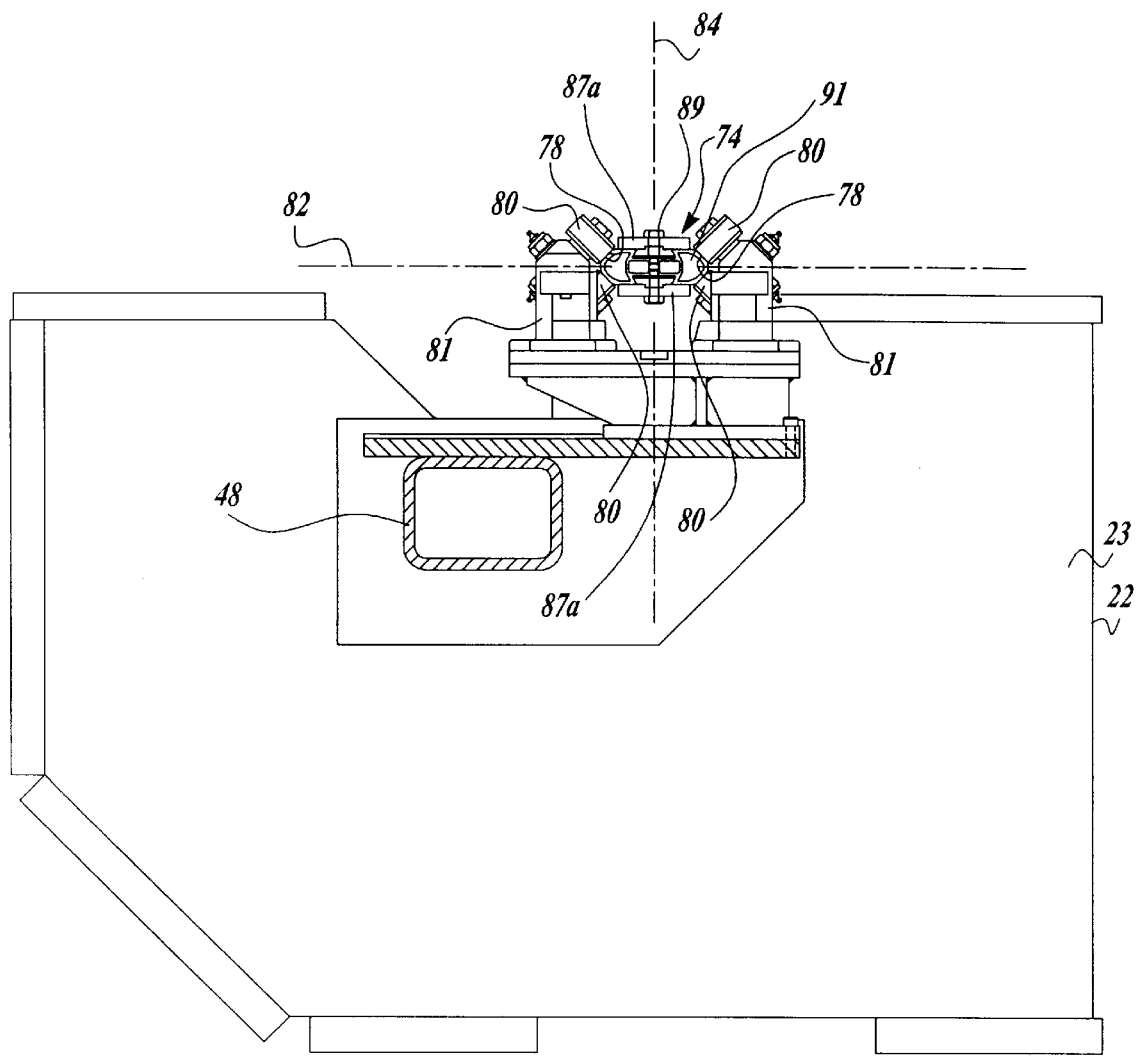
FIG. 8 is a cross-sectional view taken along lines 8—8 of FIG. 1 with portions removed for clarity.

As shown in FIGS. 2–6, the accelerator 10 includes a rack 74 having teeth 76 extending outward along its lower surface 77. The rack 74 is mounted for reciprocal movement on the support beam 48. As shown in FIGS. 7 and 8, the rack is formed of a hollow section 91. Attached to the hollow section 91 to form the upper and lower surface of the rack 74 are plate-like members 87a. The plate-like members 87a provide further rigidity to the rack 74 and can be made of a hardened material into which the teeth 76 of the rack 74 may be cut. As illustrated, they are attached to the hollow section 91 by a plurality of threaded fasteners 89. It should be appreciated that the rack 74 may be made of a single extrusion. Typically, the rack 74 is formed of extruded aluminum which is both lightweight and strong. Use of a hollow extrusion reduces the overall mass and corresponding inertia of the rack 74. As illustrated, the rack 74 is supported in two ways. The first is a two-axis support, seen generally at 75, providing stability and preventing movement of the rack 74 in a direction transverse its longitudinal axis. As shown more clearly in FIGS. 7 and 8, the rack 74 has chamfered corners 78 forming a flat surface 79 at each corner thereof when viewed in a cross-section taken transverse the longitudinal axis of the rack 74. A plurality of supports, shown in the preferred embodiment as rollers 80, mounted to support brackets 81 fixed to the frame 40, engage the chamfered corners 78 of the rack 74 and provide support while preventing movement in either the x or y axis 82, 84. Mounting the rack 74 in this manner secures the rack 74 in its proper position while maintaining access to the teeth 76 located on the lower surface 77 of the rack 74.

Figure 5:
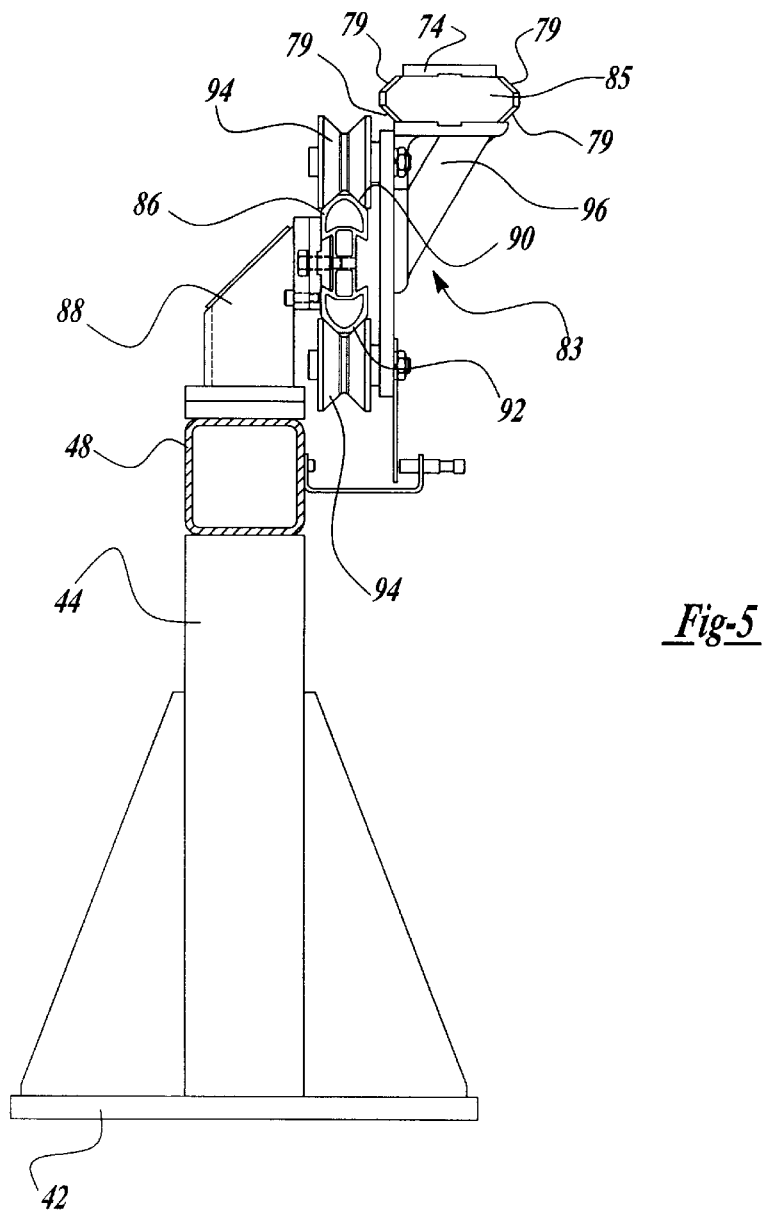
FIG. 5 is a side view of the apparatus of FIG. 1.
Figure 6:
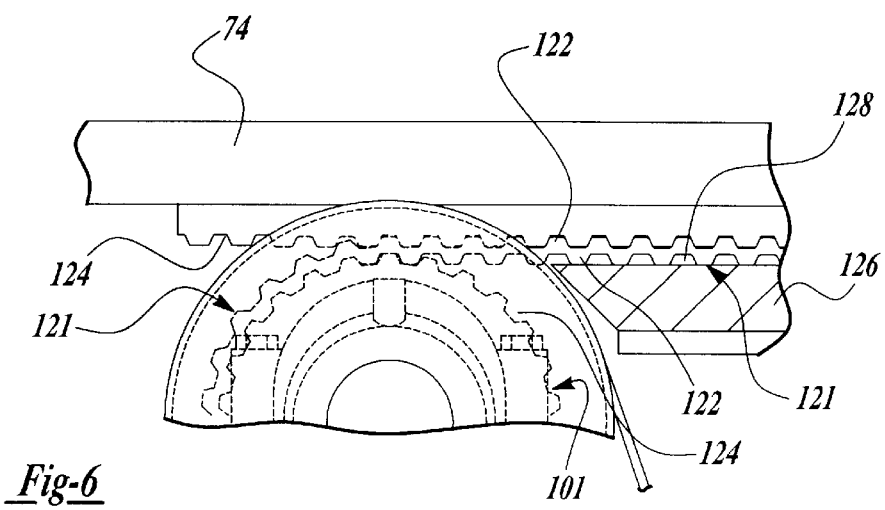
FIG. 6 is an enlarged view of the area shown in circle 6—6 of FIG. 1.

The second way is a guide rail assembly, seen generally at 83, which supports the free end 85 of the rack 74. As shown in FIG. 5, a guide rail 86 is attached to the support beam 48. The guide rail 86 is mounted on the support beam 48 by a pair of upright brackets 88, see FIG. 2, which are attached to one side of the guide rail 86. As shown, the upper 90 and lower 92 surfaces of the guide rail 86, are v-shaped such that a pair of complementary shaped rollers 94 engage and sandwich the guide rail 86 therebetween as they travel along the guide rail 86. A mounting bracket 96 attaches or couples the rollers 94 to the rack 74, thus supporting the free end 85 of the rack 74.

Figure 2:
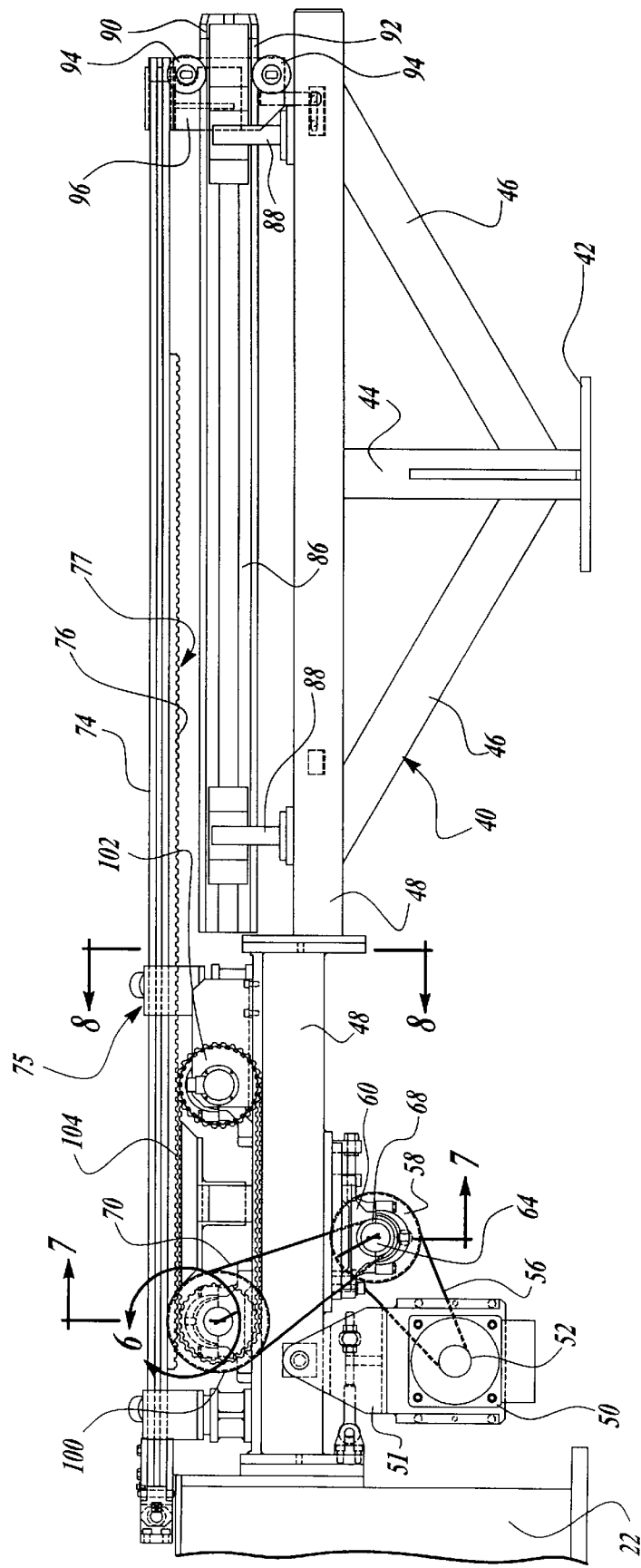
FIG. 2 is a front view of the apparatus of FIG. 1 with portions of the cut-off machine removed for clarity.

Turning now to the drive unit 72, the drive unit includes a drive pulley 100, an idler pulley 102 and an endless drive belt 104 disposed about the drive pulley 100 and idler pulley 102. In the preferred embodiment, both the drive pulley 100 and the idler pulley 102 have teeth 101, 103 on their respective outer circumferential surfaces. Both the drive pulley 100 and the idler pulley 102 are mounted to the frame 40 in a similar manner. The drive pulley 100 is secured to a drive shaft 106 that is journaled in a plurality of bearing supports 108 attached to the frame 40. A torque limiter 110 is mounted to one end of the drive shaft 106 opposite the drive pulley 100. The second power transmission belt 70 connects the torque limiter 110 to the output shaft 64 of the reduction unit 60. As illustrated in FIG. 2, rotation of the power shaft 54 correspondingly inputs power and causes rotation of the reduction unit 60 which transfers power through the second power transmission belt 70 to the torque limiter 110 which correspondingly rotates the drive shaft 106 and drive pulley 100. In the preferred construction, the idler pulley 102 is secured to the frame 40 in the same manner as the drive pulley 100; i.e., the idler pulley 102 is mounted to an idler shaft 1 14 journaled in a plurality of bearing supports 116 attached to the frame 40.

One feature of the invention is that the drive belt 104 has teeth 121 on both its inner 118 and outer 120 surfaces. In accordance with the invention, the teeth 121 of the drive belt 104 cooperate with the teeth 101, 103 of the drive pulley 100 and the idler pulley 102, and the teeth of the rack 76 to provide a zero clearance mesh between the respective components and the drive belt 104. In the preferred embodiment, zero clearance mesh is accomplished by each individual tooth 122 of the drive belt 104 being trapezoidal-shaped and slightly larger than the corresponding individual sockets 124 on both the drive pulley 100 and the rack 74. The drive belt 104 is a polyurethane reinforced belt, which as set forth above, is formed of a dimension; i.e., size that results in a slight interference fit between the rack 74 and the drive belt 104 and the drive pulley 100 and the drive belt 104. Use of such a material and design causes the drive belt 104 to be compressed between the rack 74 and the drive pulley 100 during operation of the accelerator 10. Compressing the drive belt 104 assists in obtaining a zero clearance mesh between the drive unit 72, the rack 74 and the drive belt 104 which helps to eliminate backlash from occurring during operation of the accelerator 10 as it eliminates any slack from occurring between the drive unit 72 and the rack 74. While disclosed herein as trapezoidal-shaped, the teeth 121 of the drive belt 104 may take other shapes such as involute, angular or arcuate, which when used in combination with the drive unit 72 and the rack 74, results in zero clearance mesh between the components.

The drive unit 72 further includes a support shoe 126 having a slightly arcuate upper surface 128, disposed between the drive pulley 100 and idler pulley 102. The arcuate upper surface 128 performs two functions; one, it provides support for the drive belt 104 along its Teflon® coated upper surface; and two, the arcuate upper surface 128 guides and promotes contact between the drive belt 104 and the rack 74.

The drive unit 72 further includes a tension pulley 130 which acts on an outer surface 120 of the drive belt 104. The tension pulley 130 includes a force generating mechanism, typically a spring 132, which forces the tension pulley 130 into contact with the drive belt 104. The force applied by the spring 132 may be varied to control contact pressure between the drive belt 104 and the drive pulley 100 and the idler pulley 102. The greater the force applied the greater the contact pressure.

As set forth above, in the preferred embodiment, under normal operating conditions, the drive belt 104 has some slack which during operation is taken up by the tension pulley 130. The drive unit 72 takes advantage of the slack occurring in the drive belt 104 during normal operation by combining it with the tension pulley 130 and the torque limiter 110 to prevent breakage of the drive belt 104 should movement of the rack 74 suddenly be controlled or changed by the tube; i.e., during the severing operation, the cut-off die set 18 is clamped to the moving tubing 24 which generates a greater force than that of the accelerator 10. Should the tubing 24 velocity vary, it would override the accelerator 10. The components act together as follows: the drive pulley, as shown in FIG. 4, rotates in a counterclockwise manner; when the drive belt 104 and rack 74 are moving in a right-to-left direction. Should the power source 50 be overpowered for any reason, for example the rack continues to move as a result of the cut-off die set 18 being clamped to the moving tubing 24, the idler pulley 102 would continue to rotate, attempting to stretch the drive belt 104 and removing any slack from the lower section of the drive belt 104. As shown, tightening the drive belt 104 would cause the tension roller 130 to be urged outward. After any slack is taken up, the drive belt 104 is momentarily stretched. Continued stretching of the drive belt 104 is then relieved by the torque limiter 110 which allows the drive pulley 100 to move independently of the power source 50.

As disclosed, the present invention provides an accelerator 10 with a low inertia drive unit 72, the components of which are lightweight and strong. Such an assembly reduces the overall mass previously necessary to accelerate the cut-off die set such as a planetary gear and rack system. Additionally, an accelerator apparatus such as disclosed above works well with the increased mass of modern cut-off die sets, a mass that previous rack and pinion arrangements were unable to accelerate. Additionally, use of a zero backlash design allows for precision cutting of tubing emanating at high rates of speeds from a fabrication mill.

What is claimed is:

1. An apparatus for use in severing sections of an elongated workpiece continuously moving along a longitudinal axis of the elongated workpiece comprising:

a frame, said frame including a support beam secured to a base;

a rack mounted to said support beam for reciprocal movement along the axis of said workpiece, said rack having a rectangular cross-section including chamfered corners;

a plurality of rollers mounted to said support beam and engaging said chamfered corners to support and guide said rack;

a drive unit secured to said frame and engaging said rack, actuation of said drive unit causing reciprocal movement of the rack along the longitudinal axis of the workpiece.

2. An apparatus as set forth in claim 1 including:

a guide rail secured to said support beam;

a support bracket having a pair of opposed rollers secured thereto, said pair of opposed rollers positioned such that they sandwich said guide rail therebetween such that said support bracket moves freely along said guide rail; and said rack secured to said support bracket.

3. An apparatus for use in severing sections of an elongated workpiece continuously moving along a longitudinal axis of the elongated workpiece comprising:

a cut-off machine having a work treatment area;

a carriage mounted in said work treatment area for reciprocal movement along the longitudinal axis of the elongated workpiece disposed in said work treatment area;

a frame, said frame including a base and a support beam;

a rack mounted to said support beam for reciprocal movement parallel the longitudinal axis of said workpiece, said rack connected at one end thereof to said carriage wherein movement of said rack causes movement of said carriage, said rack having a rectangular cross-section including chamfered corners;

a plurality of first rollers mounted to said support beam and engaging said chamfered corners to support and guide said rack;

a guide rail secured to said support beam;

a support bracket having a pair of opposed second rollers secured thereto, said second rollers positioned such that they engage and sandwich therebetween said guide rail, said rack secured to said support bracket at one end thereof; and a power train for transferring power to said rack, said power train including a drive unit having a drive pulley, an idler pulley and an endless drive belt disposed about said drive pulley and said idler pulley wherein said belt engages said rack such that rotation of said drive belt about said drive pulley and said idler pulley causes movement of said rack.

4. An apparatus as set forth in claim 3 including a tension pulley connected to said frame and pressing against said drive belt; and a support shoe positioned between said drive pulley and said idler pulley such that said support shoe engages and supports said drive belt in an area of engagement with said rack.

5. An apparatus for use in severing sections of an elongated workpiece continuously moving along a longitudinal axis of said elongated workpiece comprising:

a cut-off machine having a work treatment area;

a carriage mounted in said work treatment area for reciprocal movement along the longitudinal axis of the workpiece;

a frame;

a rack mounted to said frame for reciprocal movement said, rack connected to said carriage such that movement of said rack results in movement of said carriage;

a drive unit engaging said rack, said drive unit including a drive pulley, an idler pulley and an endless belt disposed about said drive pulley and said idler pulley, said endless belt engaging said rack such that movement of said endless belt causes movement of said rack;

a plurality of supports engaging and supporting said rack, said supports preventing movement of said rack in a direction transverse the longitudinal axis of said workpiece; and said rack, when viewed in a cross-section taken transverse its longitudinal axis, having a rectangular shape with chamfered corners, and said plurality of supports including rollers mounted on said frame, said rollers positioned such that they contact said rack on said chamfered corners.

* * * * *